(12) United States Patent
Yim

(10) Patent No.: US 12,406,603 B2
(45) Date of Patent: Sep. 2, 2025

(54) DISPLAY DEVICE AND A DRIVING METHOD THEREOF

(71) Applicant: SAMSUNG DISPLAY CO., LTD., Yongin-si (KR)

(72) Inventor: Dale Yim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/419,980

(22) Filed: Jan. 23, 2024

(65) Prior Publication Data

US 2024/0346963 A1    Oct. 17, 2024

(30) Foreign Application Priority Data

Apr. 17, 2023  (KR) .................. 10-2023-0050302

(51) Int. Cl.
*G09G 3/00* (2006.01)
*G09G 3/20* (2006.01)
*G09G 3/3233* (2016.01)
*H04N 13/324* (2018.01)
*H04N 13/344* (2018.01)

(52) U.S. Cl.
CPC ........... *G09G 3/001* (2013.01); *G09G 3/2007* (2013.01); *G09G 3/3233* (2013.01); *H04N 13/324* (2018.05); *H04N 13/344* (2018.05); G09G 2300/0819 (2013.01); G09G 2300/0842 (2013.01); G09G 2300/0861 (2013.01); G09G 2320/0242 (2013.01); G09G 2320/045 (2013.01); G09G 2320/0666 (2013.01); G09G 2320/0673 (2013.01); G09G 2330/021 (2013.01)

(58) Field of Classification Search
CPC ................ G09G 3/2007; G09G 3/003; G09G 2320/0666; G09G 2320/0673; G09G 2340/06; G09G 3/001; G09G 3/3233; H04N 13/344; H04N 13/324
See application file for complete search history.

(56) References Cited

U.S. PATENT DOCUMENTS

| | | | |
|---|---|---|---|
| 2007/0127121 A1* | 6/2007 | Maximus | G02B 30/23 348/E13.058 |
| 2018/0218659 A1* | 8/2018 | Kimura | G09G 5/00 |
| 2019/0156466 A1* | 5/2019 | Cho | G06F 1/163 |
| 2020/0234626 A1* | 7/2020 | Yim | G09G 3/2011 |
| 2020/0265797 A1* | 8/2020 | Croxford | G09G 3/2092 |
| 2020/0327700 A1* | 10/2020 | Cooper | G06F 3/1423 |

* cited by examiner

*Primary Examiner* — Xuemei Zheng
(74) *Attorney, Agent, or Firm* — CHAU & ASSOCIATES, LLC

(57) ABSTRACT

A display device including: a processor outputting an input frame; a stereo frame generator generating a first frame and a second frame based on the input frame; a first sub-display device displaying a first image based on the first frame; and a second sub-display device displaying a second image based on the second frame, wherein a first color gamut of the first frame is different from a second color gamut of the second frame.

20 Claims, 12 Drawing Sheets

FIG. 11

LVL_CS
LVL_R=[246,0,0]
LVL_G=[ 8,235,0]
LVL_B=[ 1,0,205]
LVL_C=[ 9,235,205]
LVL_M=[247,0,205]
LVL_Y=[254,235,0]
LVL_W=[255,235,205]

=

RCf
RCf_R=[255,0,0]
RCf_G=[0,255,0]
RCf_B=[0,0,255]
RCf_C=[0,255,255]
RCf_M=[255,0,255]
RCf_Y=[255,255,0]
RCf_W=[255,255,255]

+

OFf
OFf_R=[-9,0,0]
OFf_G=[ 8,-20,0]
OFf_B=[ 1,0,-50]
OFf_C=[ 9,-20,-50]
OFf_M=[-8,0,-50]
OFf_Y=[-1,-20,0]
OFf_W=[0,-20,-50]

FIG. 12

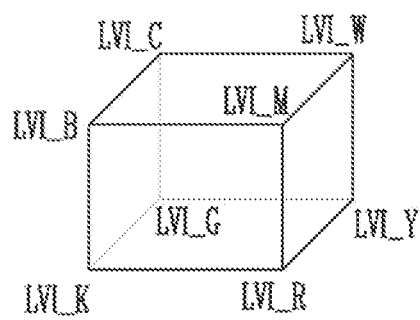

| Case | condition | C1 | C2 | C3 |
|---|---|---|---|---|
| A1 | Rlg> Glg>Blg | LVL_R-LVL_K | LVL_C-LVL_B | LVL_W-LVL_Y |
| A2 | Rlg> Blg>Glg | LVL_R-LVL_K | LVL_W-LVL_M | LVL_M-LVL_R |
| A3 | Blg> Rlg>Glg | LVL_M-LVL_B | LVL_W-LVL_M | LVL_B-LVL_K |
| A4 | Glg> Rlg>Blg | LVL_Y-LVL_G | LVL_G-LVL_K | LVL_W-LVL_Y |
| A5 | Glg> Blg>Rlg | LVL_W-LVL_C | LVL_G-LVL_K | LVL_C-LVL_G |
| A6 | Blg> Glg>Rlg | LVL_W-LVL_C | LVL_C-LVL_B | LVL_B-LVL_K |

DISPLAY DEVICE AND A DRIVING METHOD THEREOF

CROSS-REFERENCE TO RELATED APPLICATION

This application claims priority under 35 U.S.C. § 119 to Korean Patent Application No. 10-2023-0050302, filed Apr. 17, 2023, the disclosure of which is incorporated by reference herein in its entirety.

TECHNICAL FIELD

The present invention relates to a display device and a driving method thereof.

DISCUSSION OF THE RELATED ART

The advancement of information technology underscores the importance of display devices as interfaces between users and information. Consequently, the use of display devices such as liquid crystal display devices and organic light emitting display devices is on the rise.

In response to user demand, various types of display devices are emerging. For example, augmented reality glasses may feature a display unit for both the left and right eyes. The augmented reality glasses can create the illusion of an image object existing in reality by displaying a reality background on one part and an image object on the other part. In another example, the augmented reality glasses can also produce the augmented reality effect by operating as a transparent display in one part and displaying an image object on the other part.

In this case, the augmented reality glasses may express an image object in three dimensions by using binocular parallax of the left and right eye images. However, generating and transmitting the left and right eye images demands high hardware specifications and leads to increased power consumption.

SUMMARY

An embodiment of the present invention provides a display device capable of generating a stereo image on its own even though a processor generates and transmits only a mono image, and a driving method thereof.

An embodiment of the present invention provides a display device including: a processor outputting an input frame; a stereo frame generator generating a first frame and a second frame based on the input frame; a first sub-display device displaying a first image based on the first frame; and a second sub-display device displaying a second image based on the second frame, wherein a first color gamut of the first frame is different from a second color gamut of the second frame.

The number of grayscales included in the input frame is the same as the number of grayscales included in each of the first frame and the second frame.

The stereo frame generator includes: an image separation unit generating a first separation frame that includes first grayscales for a first color of the input frame and generating a second separation frame that includes second grayscales for a second color of the input frame and third grayscales for a third color of the input frame; a gamma application unit generating a first gamma frame by applying a gamma curve to grayscales included in the first separation frame and generating a second gamma frame by applying the gamma curve to grayscales included in the second separation frame; a color gamut correction unit generating a first correction frame by applying the first color gamut to the first gamma frame and generating a second correction frame by applying the second color gamut to the second gamma frame; and an inverse gamma application unit generating the first frame by applying an inverse gamma curve to the first correction frame and generating the second frame by applying the inverse gamma curve to the second correction frame.

The color gamut correction unit includes: a plurality of first lookup tables that include a plurality of first offset information; a first offset information generator receiving a first shift level and generating first final offset information corresponding to the first shift level based on the plurality of first offset information; a plurality of second lookup tables that include a plurality of second offset information; and a second offset information generator receiving a second shift level and generating second final offset information corresponding to the second shift level based on the plurality of second offset information.

The plurality of second offset information is inverted values of the plurality of first offset information.

The first offset information generator generates the first final offset information by summing or interpolating the plurality of first offset information, and the second offset information generator generates the second final offset information by summing or interpolating the plurality of second offset information.

The color gamut correction unit further includes: a plurality of reference lookup tables that include a plurality of reference color gamut information; and a multiplexer outputting selected reference color gamut information among the plurality of reference color gamut information based on color mode information.

The color gamut correction unit further includes: a first color gamut application unit determining the first color gamut based on the selected reference color gamut information and the first final offset information, and generating the first correction frame by applying the first color gamut to the first gamma frame; and a second color gamut application unit determining the second color gamut based on the selected reference color gamut information and the second final offset information, and generating the second correction frame by applying the second color gamut to the second gamma frame.

The first color gamut application unit determines the first color gamut by adding the selected reference color gamut information and the first final offset information, and the second color gamut application unit determines the second color gamut by adding the selected reference color gamut information and the second final offset information.

The first color gamut application unit generates the first correction frame by mapping grayscales included in the first gamma frame into a range of the first color gamut, and the second color gamut application unit generates the second correction frame by mapping grayscales included in the second gamma frame into a range of the second color gamut.

An embodiment of the present invention provides a driving method of a display device including: generating a first frame and a second frame based on an input frame; displaying a first image through a first sub-display device based on the first frame; and displaying a second image through a second sub-display device based on the second frame, wherein a first color gamut of the first frame is different from a second color gamut of the second frame.

The number of grayscales included in the input frame is the same as the number of grayscales included in each of the first frame and the second frame.

The generating the first frame and the second frame includes: generating a first separation frame that includes first grayscales for a first color of the input frame and generating a second separation frame that includes second grayscales for a second color of the input frame and third grayscales for a third color of the input frame; generating a first gamma frame by applying a gamma curve to grayscales included in the first separation frame and generating a second gamma frame by applying the gamma curve to grayscales included in the second separation frame; generating a first correction frame by applying the first color gamut to the first gamma frame and generating a second correction frame by applying the second color gamut to the second gamma frame; and generating the first frame by applying an inverse gamma curve to the first correction frame and generating the second frame by applying the inverse gamma curve to the second correction frame.

The driving method further includes: generating first final offset information corresponding to a first shift level based on the first shift level and a plurality of first offset information; and generating second final offset information corresponding to a second shift level based on the second shift level and a plurality of second offset information.

The plurality of second offset information is inverted values of the plurality of first offset information.

The first final offset information is generated by summing or interpolating the plurality of first offset information, and the second final offset information is generated by summing or interpolating the plurality of second offset information.

The driving method further includes selecting one of a plurality of reference color gamut information based on color mode information.

The first color gamut is determined based on the selected reference color gamut information and the first final offset information, and the first correction frame is generated by applying the first color gamut to the first gamma frame, and the second color gamut is determined based on the selected reference color gamut information and the second final offset information, and the second correction frame is generated by applying the second color gamut to the second gamma frame.

The first color gamut is determined by adding the selected reference color gamut information and the first final offset information, and the second color gamut is determined by adding the selected reference color gamut information and the second final offset information.

The first correction frame is generated by mapping grayscales included in the first gamma frame into a range of the first color gamut, and the second correction frame is generated by mapping grayscales included in the second gamma frame into a range of the second color gamut.

BRIEF DESCRIPTION OF THE DRAWINGS

FIGS. 7, 8, 9, 10, 11 and 12 are diagrams for explaining a color gamut correction unit according to an embodiment of the present invention.

DETAILED DESCRIPTION OF THE EMBODIMENTS

Figure 1:
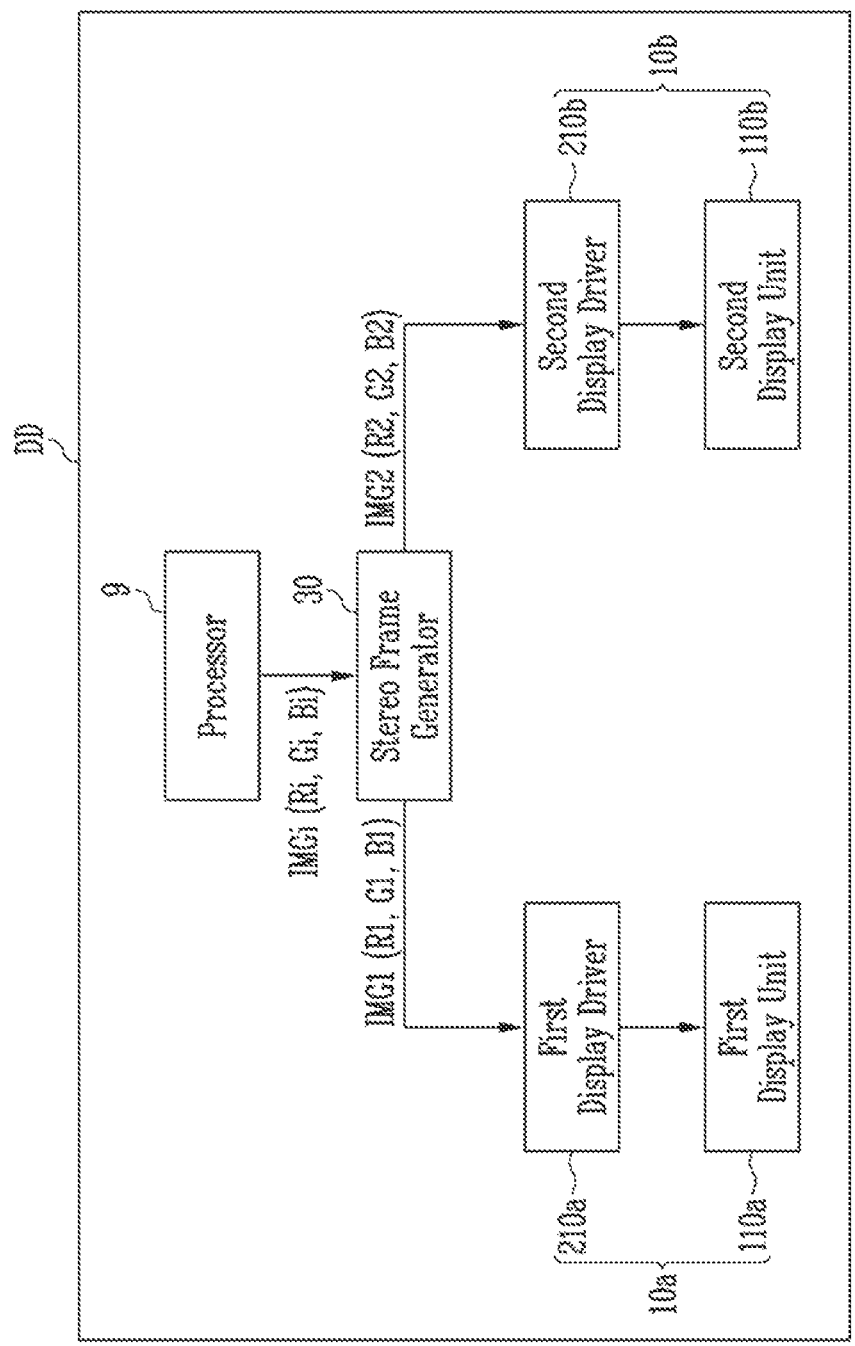
FIG. 1 is a diagram for explaining a display device according to an embodiment of the present invention.

Hereinafter, various embodiments of the present invention will be described in detail with reference to the accompanying drawings. The present invention may be embodied in various different forms and is not limited to the embodiments described herein.

The same or similar components may be denoted by the same reference numerals throughout the specification.

In addition, in the description, the expression "is the same" may mean "substantially the same".

FIG. 1 is a diagram for explaining a display device according to an embodiment of the present invention.

Referring to FIG. 1, a display device DD according to an embodiment of the present invention may include a processor 9, a stereo frame generator 30, a first sub-display device 10a, and a second sub-display device 10b.

The processor 9 may be an application processor, a central processing unit (CPU), a graphics processing unit (GPU), or the like. The processor 9 may provide an input frame IMGi. In other words, the processor 9 may generate an input frame IMGi and provide it to the stereo frame generator 30. A plurality of input frames may correspond to still images constituting each viewpoint of a moving image.

The input frame IMGi may include a first grayscale Ri, a second grayscale Gi, and a third grayscale Bi for each pixel. The first grayscale Ri may be a grayscale for expressing a first color, the second grayscale Gi may be a grayscale for expressing a second color, and the third grayscale Bi may be a grayscale for expressing a third color. The first color, second color, and third color may be different colors. For example, the first color may be one color among red, green, and blue, the second color may be one color other than the first color among red, green, and blue, and the third color may be one color other than the first and second colors among red, green, and blue. Additionally, magenta, cyan, and yellow may be used as the first to third colors instead of red, green, and blue.

In addition, the processor 9 may provide control signals. These control signals may include a horizontal synchronization signal (Hsync), a vertical synchronization signal (Vsync), and a data enable signal. The control signals may be provided to the stereo frame generator 30. The vertical synchronization signal may include a plurality of pulses, and may indicate that a previous frame period ends and a current frame period starts based on a time point at which each pulse occurs. An interval between adjacent pulses of the vertical synchronization signal may correspond to one frame period. The horizontal synchronization signal may include a plurality of pulses, and may indicate that a previous horizontal period ends and a new horizontal period starts based on a time point at which each pulse occurs. An interval between adjacent pulses of the horizontal synchronization signal may correspond to one horizontal period. Each frame period may include the same number of horizontal periods. The data enable signal may have an enable level for specific horizontal periods and a disable level for the remaining horizontal periods. The data enable signal of the enable level may indicate that effective grayscales are supplied in corresponding horizontal periods. The data enable signal of the disable level may indicate that grayscales are not supplied in corresponding horizontal periods.

The stereo frame generator 30 may generate a first frame IMG1 and a second frame IMG2 based on the input frame IMGi. In this case, the number of grayscales Ri, Gi, and Bi included in the input frame IMGi may be the same as the number of grayscales R1, G1, and B1 included in the first frame IMG1. Additionally, the number of grayscales R1, G1, and B1 included in the first frame IMG1 may be the same as the number of grayscales R2, G2, and B2 included in the second frame IMG2. In other words, the stereo frame generator 30 may generate two frames IMG1 and IMG2 based on one frame IMGi. Accordingly, even though the processor 9 generates and transmits only a mono image, the stereo frame generator 30 may generate a stereo image on its own. In other words, the display device DD can produce a stereo image independently, even when the processor 9 provides only a mono image. Accordingly, the specification of the processor 9 can be lowered and the transmission efficiency of the image can be increased.

A first color gamut of the first frame IMG1 may be different from a second color gamut of the second frame IMG2. For example, the first frame IMG1 may be a frame in which the red color of the input frame IMGi is enhanced (e.g., reddish), and the second frame IMG2 may be a frame in which the blue color of the input frame IMGi is enhanced (e.g., bluish). For another example, the first frame IMG1 may include only red grayscales Ri of the input frame IMGi, and the second frame IMG2 may include only green grayscales Gi and blue grayscales Bi of the input frame IMGi. Accordingly, the first sub-display device 10a may not use green and blue sub-pixels or the green and blue sub-pixels may be used a relatively few times or with low luminance. Additionally, the second sub-display device 10b may not use red sub-pixels or the red sub-pixels may be used a relatively few times or with low luminance. Accordingly, power consumption of the first and second sub-display devices 10a and 10b can be reduced.

The first sub-display device 10a may include a first display driver 210a and a first display unit 110a. The first sub-display device 10a may display a first image based on the first frame IMG1.

The second sub-display device 10b may include a second display driver 210b and a second display unit 110b. The second sub-display device 10b may display a second image based on the second frame IMG2.

The display device DD may be augmented reality glasses. The first display unit 110a may be a display unit for the left eye, and the user's left eye may visually recognize a first object. The second display unit 110b may be a display unit for the right eye, and the user's right eye may visually recognize a second object. The first object and the second object may overlap and the user may visually recognize a final object. The display device DD may express a three-dimensional effect of an object by using binocular parallax of the first object and the second object.

For example, when the first sub-display device 10a continues to display the first image with enhanced red color and the second sub-display device 10b continues to display the second image with enhanced blue color, the user may feel tired. Additionally, if sub-pixels of a specific color are continuously used, they may deteriorate more rapidly, leading to a difference in degree of deterioration compared to sub-pixels having a small amount of usage. Therefore, when a certain amount of time elapses, the display device DD may switch the color gamut so that the first sub-display device 10a displays a blue-enhanced image and the second sub-display device 10b displays a red-enhanced image. The display device DD may induce the user to switch the color gamut manually by generating a pop-up window asking the user whether to switch the color gamut.

In an embodiment, the stereo frame generator 30 may adjust the three-dimensional effect of an image object by adjusting the relative positions of the first frame IMG1 and the second frame IMG2. For example, by moving the first frame IMG1 corresponding to the left eye image to the left and moving the second frame IMG2 corresponding to the right eye image to the right, the three-dimensional effect of the object included in the image may be further enhanced.

Figure 2:
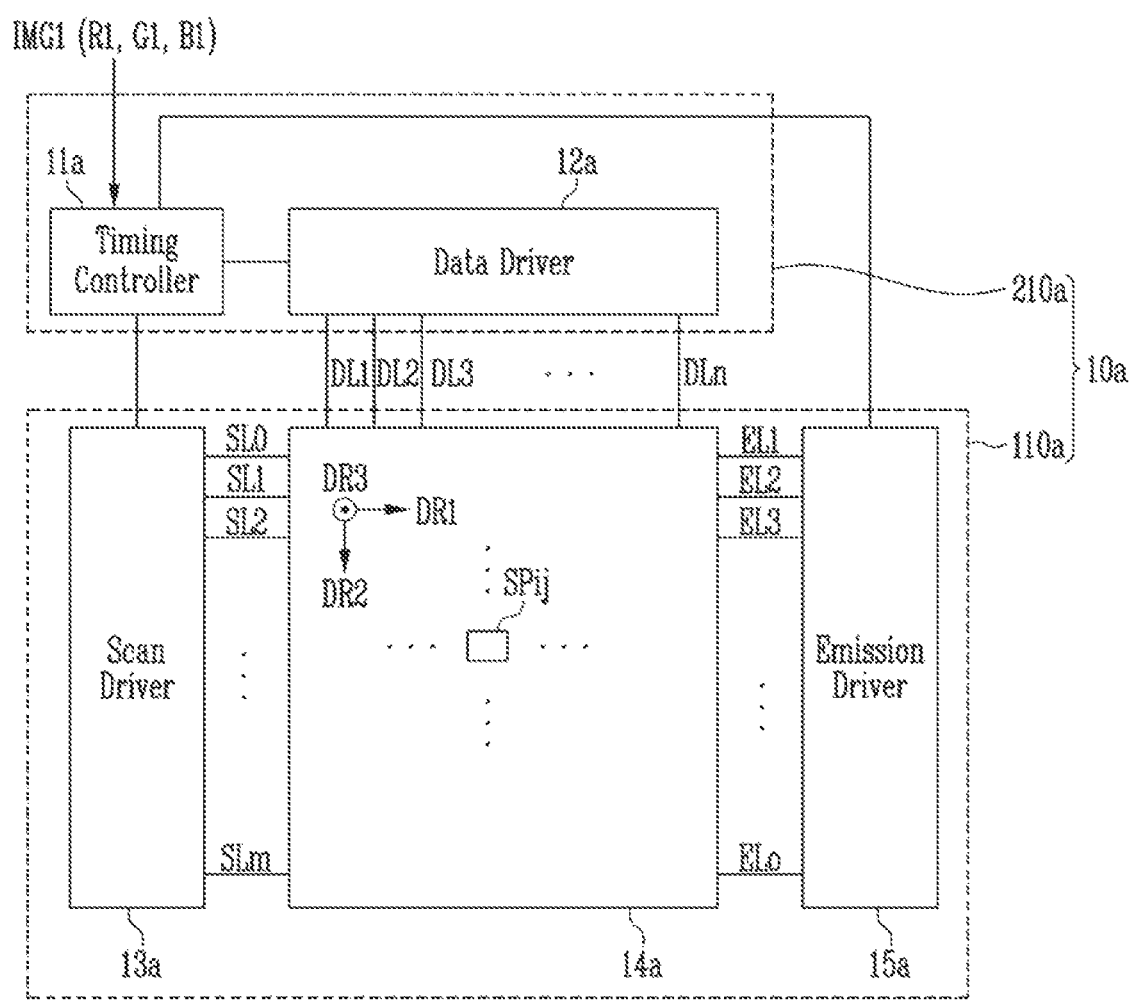
FIG. 2 is a diagram for explaining a first sub-display device according to an embodiment of the present invention.

FIG. 2 is a diagram for explaining a first sub-display device according to an embodiment of the present invention.

Referring to FIG. 2, the first sub-display device 10a according to an embodiment of the present invention may include a timing controller 11a, a data driver 12a, a scan driver 13a, a first pixel unit 14a, and an emission driver 15a.

The first display driver 210a may include the timing controller 11a and the data driver 12a. The timing controller 11a and the data driver 12a may be implemented as one integrated circuit or as two separate integrated circuits. The first display driver 210a may be electrically connected to the first display unit 110a through a flexible printed circuit board (FPCB) or a film.

The first display unit 110a may include the scan driver 13a, the first pixel unit 14a, and the emission driver 15a. The scan driver 13a, the first pixel unit 14a, and the emission driver 15a may be mounted on one substrate. However, according to an embodiment, the timing controller 11a, the data driver 12a, the scan driver 13a, and the emission driver 15a may be configured as a single integrated circuit. Additionally, depending on the structure of the first pixel unit 14a, the emission driver 15a may be unnecessary.

The timing controller 11a may receive the first frame IMG1 and other control signals. The control signals may include the vertical synchronization signal, the horizontal synchronization signal, and the data enable signal described above.

The timing controller 11a may render the grayscales R1, G1, and B1 included in the first frame IMG1 to correspond to the structure of the first pixel unit 14a and provide the rendered grayscales to the data driver 12a. In addition, the timing controller 11a may provide a clock signal, a scan start signal, and the like to the scan driver 13a. The timing controller 11a may provide a clock signal, an emission stop signal, and the like to the emission driver 15a.

The data driver 12a may generate data voltages to be provided to data lines DL1, DL2, DL3, . . . , and DLn using the grayscales and the control signals received from the timing controller 11a. For example, the data driver 12a may sample the grayscales using the clock signal and apply the data voltages corresponding to the grayscales to the data lines DL1 to DLn in units of pixel rows, where n may be an integer greater than 0. A pixel row may refer to sub-pixels connected to the same scan lines and emission lines.

The scan driver 13a may receive the clock signal, the scan start signal, and the like from the timing controller 11a and generate scan signals to be provided to scan lines SL0, SL1, SL2, . . . , and SLm. For example, the scan driver 13a may sequentially provide the scan signals having turn-on level pulses to the scan lines SL0 to SLm. For example, the scan driver 13a may be configured in the form of a shift register, and may generate the scan signals by sequentially transmitting the scan start signal in the form of a turn-on level pulse to a next stage circuit under control of the clock signal, where m may be an integer greater than 0.

The emission driver 15a may receive the clock signal, the emission stop signal, and the like from the timing controller 11a and generate emission signals to be provided to emission lines EL1, EL2, EL3, . . . , and ELo. For example, the emission driver 15a may sequentially provide the emission signals having turn-off level pulses to the emission lines EL1 to ELo. For example, the emission driver 15a may be configured in the form of a shift register, and may generate the emission signals by sequentially transmitting the emission stop signal in the form of a turn-off level pulse to a next stage circuit under control of the clock signal, where o may be an integer greater than 0.

The first pixel unit 14a may include the sub-pixels. Each sub-pixel SPij may be connected to a corresponding data line, scan line, and emission line, where i and j may be integers greater than 0. The sub-pixel SPij may refer to a sub-pixel in which a scan transistor is connected to an i-th scan line and a j-th data line.

The first pixel unit 14a may include sub-pixels emitting light of a first color, sub-pixels emitting light of a second color, and sub-pixels emitting light of a third color. The sub-pixels of the first pixel unit 14a may be arranged in various forms such as diamond PENTILE™, RGB-Stripe, S-stripe, real RGB, and normal PENTILE™.

The sub-pixels of the first pixel unit 14a are arranged in a first direction DR1 and a second direction DR2 perpendicular to the first direction DR1. In addition, the direction in which the sub-pixels emit light is a third direction DR3 perpendicular to the first and second directions DR1 and DR2. Within the first pixel unit 14a, the data lines DL1 to DLn extend in the second direction DR2 and are arranged parallel to each other in the first direction DR1. Within the first pixel unit 14a, the scan lines SL0 to SLm extend in the first direction DR1 and are arranged parallel to each other in the second direction DR2. Within the first pixel unit 14a, the emission lines EL1 to ELo extend in the first direction DR1 and are arranged parallel to each other in the second direction DR2.

Figure 3:
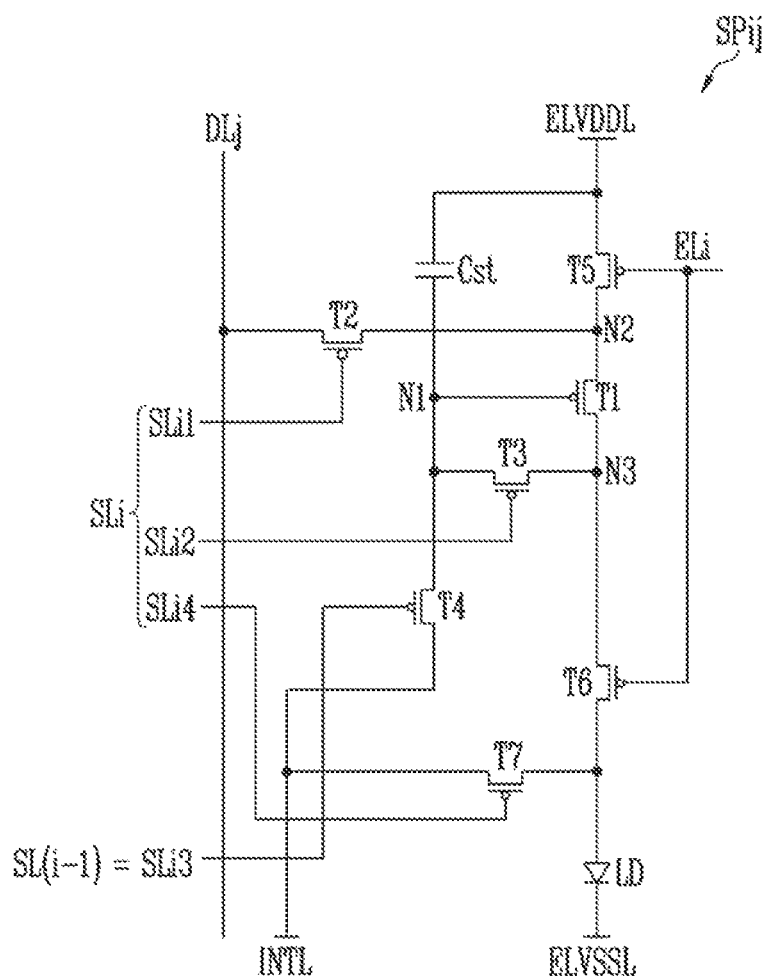
FIG. 3 is a diagram for explaining a sub-pixel according to an embodiment of the present invention.

FIG. 3 is a diagram for explaining a sub-pixel according to an embodiment of the present invention.

Referring to FIG. 3, the sub-pixel SPij may include transistors T1, T2, T3, T4, T5, T6, and T7, a storage capacitor Cst, and a light emitting element LD.

Hereinafter, a circuit composed of P-type transistors will be described as an example. However, those skilled in the art may design a circuit composed of N-type transistors by changing the polarity of a voltage applied to a gate terminal. Similarly, a person skilled in the art will be able to design a circuit composed of a combination of P-type and N-type transistors. A P-type transistor generally refers to a transistor where current flow increases as a voltage difference between a gate electrode and a source electrode increases in a negative direction. An N-type transistor generally refers to a transistor where current flow increases as a voltage difference between a gate electrode and a source electrode increases in a positive direction. The transistor may be configured in various forms, such as a thin film transistor (TFT), a field effect transistor (FET), or a bipolar junction transistor (BJT).

A first transistor T1 may have a gate electrode connected to a first node N1, a first electrode connected to a second node N2, and a second electrode connected to a third node N3. The first transistor T1 may be referred to as a driving transistor.

A second transistor T2 may have a gate electrode connected to a scan line SLi1, a first electrode connected to a data line DLj, and a second electrode connected to the second node N2. The second transistor T2 may be referred to as a scan transistor.

A third transistor T3 may have a gate electrode connected to a scan line SLi2, a first electrode connected to the first node N1, and a second electrode connected to the third node N3. The third transistor T3 may be referred to as a diode-connected transistor.

A fourth transistor T4 may have a gate electrode connected to a scan line SLi3, a first electrode connected to the first node N1, and a second electrode connected to an initialization line INTL. The first electrode of the fourth transistor T4 is connected to the gate electrode of the first transistor T1 and the first electrode of the third transistor T3. The fourth transistor T4 may be referred to as a gate initialization transistor.

A fifth transistor T5 may have a gate electrode connected to an i-th emission line ELi, a first electrode connected to a first power source line ELVDDL, and a second electrode connected to the second node N2. Here, the second electrode of the fifth transistor T5 is connected to the first electrode of the first transistor T1 and the second electrode of the second transistor T2. The fifth transistor T5 may be referred to as an emission transistor. In another embodiment, the gate electrode of the fifth transistor T5 may be connected to an emission line different from an emission line connected to a gate electrode of a sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to the emission line different from the emission line connected to the gate electrode of the fifth transistor T5.

A seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power source line ELVDDL, and a second electrode of the storage capacitor Cst may be connected to the first node N1.

The light emitting element LD may have the anode connected to the second electrode of the sixth transistor T6 and a cathode connected to a second power source line ELVSSL. The light emitting element LD may be a light emitting diode. The light emitting element LD may be composed of an organic light emitting diode, an inorganic light emitting diode, a quantum dot/well light emitting diode, or the like. In this embodiment, each sub-pixel has only one light emitting element LD, but in another embodiment, each sub-pixel may have a plurality of light emitting elements. In this case, the plurality of light emitting elements may be connected in series, in parallel, or in series and parallel. The light emitting element LD of each sub-pixel SPij may emit light of one of the first color, the second color, and the third color.

A first power source voltage may be applied to the first power source line ELVDDL, a second power source voltage may be applied to the second power source line ELVSSL, and an initialization voltage may be applied to the initialization line INTL. For example, the first power source voltage may be greater than the second power source voltage. For example, the initialization voltage may be equal to or greater than the second power source voltage. For example, the initialization voltage may correspond to the smallest data voltage among data voltages corresponding to color grayscales. In another example, the magnitude of the initialization voltage may be smaller than the magnitudes of data voltages corresponding to color grayscales.

Figure 4:
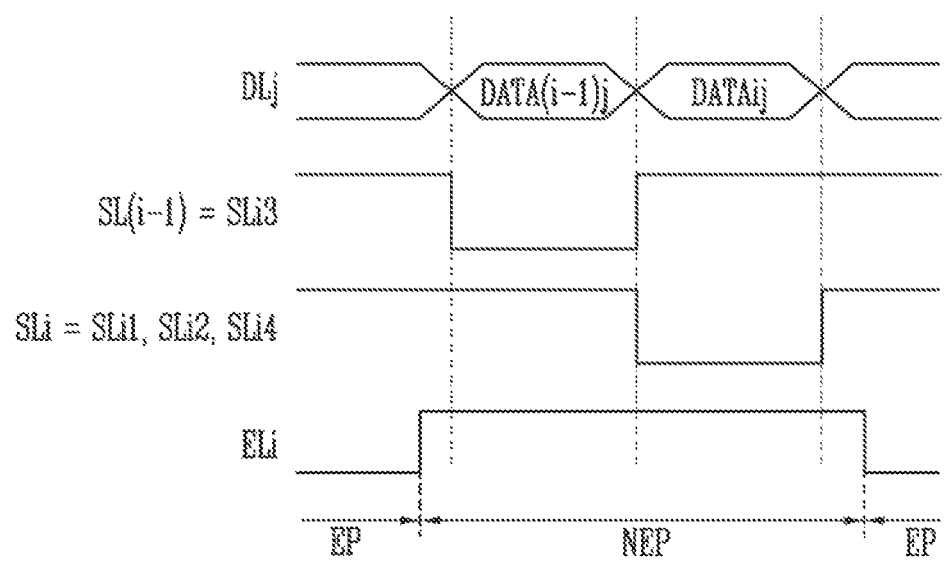
FIG. 4 is a diagram for explaining a method of driving the sub-pixel of FIG. 3.

FIG. 4 is a diagram for explaining a method of driving the sub-pixel of FIG. 3.

Hereinafter, for convenience of description, it is assumed that the scan lines SLi1, SLi2, and SLi4 are an i-th scan line SLi, and the scan line SLi3 is an (i−1)th scan line SL(i−1). However, the scan lines SLi1, SLi2, SLi3, and SLi4 may have various connection relationships according to embodiments. For example, the scan line SLi4 may be the (i−1)th scan line or an (i+1)th scan line.

First, an emission signal of a turn-off level (e.g., a logic high level) may be applied to the i-th emission line ELi, a data voltage DATA (i−1) j for an (i−1)th sub-pixel may be applied to the data line DLj, and a scan signal of a turn-on level (e.g., a logic low level) may be applied to the scan line SLi3. High/low at the logic level may vary depending on whether the transistor is a P-type or an N-type.

In this case, since a scan signal of a turn-off level is applied to the scan lines SLi1 and SLi2, the second transistor T2 may be in a turned-off state and the data voltage DATA (i−1) j for the i-th sub-pixel SPij may be prevented from being applied to the i-th sub-pixel SPij.

In this case, since the fourth transistor T4 is in a turned-on state, a voltage of the first node N1 may be initialized by connecting the first node N1 to the initialization line INTL. Since the emission signal of the turn-off level is applied to the emission line ELi, the fifth and sixth transistors T5 and T6 may be in a turned-off state, and the light emitting element LD may be prevented from emitting light unnecessarily when the initialization voltage is applied.

Next, a data voltage DATAij for the i-th sub-pixel SPij may be applied to the data line DLj, and the scan signal of the turn-on level may be applied to the scan lines SLi1 and SLi2. Accordingly, the second, first and third transistors T2, T1, and T3 may be in a turned-on state, and the data line DLj and the first node N1 may be electrically connected to each other. Therefore, a compensation voltage obtained by subtracting a threshold voltage of the first transistor T1 from the data voltage DATAij may be applied to the second electrode (in other words, the first node N1) of the storage capacitor Cst, and the storage capacitor Cst may maintain a voltage corresponding to a difference between the first power source voltage and the compensation voltage. This period may be referred to as a threshold voltage compensating period or a data writing period.

In addition, when the scan line SLi4 is the i-th scan line, since the seventh transistor T7 may be in a turned-on state, the anode of the light emitting element LD and the initialization line INTL may be connected to each other. Therefore, the light emitting element LD may be initialized with a charge amount corresponding to a voltage difference between the initialization voltage and the second power source voltage.

Thereafter, as an emission signal of a turn-on level is applied to the i-th emission line ELi, the fifth and sixth transistors T5 and T6 may be turned on. Therefore, a driving current path connecting the first power source line ELVDDL, the fifth transistor T5, the first transistor T1, the sixth transistor T6, the light emitting element LD, and the second power source line ELVSSL may be formed.

The amount of driving current flowing through the first electrode and the second electrode of the first transistor T1 may be adjusted according to the voltage maintained in the storage capacitor Cst. The light emitting element LD may emit light with a luminance corresponding to the amount of driving current. The light emitting element LD may emit light until the emission signal of the turn-off level is applied to the emission line ELi.

When the emission signal is at the turn-on level, sub-pixels receiving the emission signal may be in a display state. Accordingly, a period in which the emission signal is at the turn-on level may be referred to as an emission period EP (or emission permissible period). Additionally, when the emission signal is at the turn-off level, sub-pixels receiving the emission signal may be in a non-display state. Accordingly, a period in which the emission signal is at the turn-off level may be referred to as a non-emission period NEP (or emission non-permission period).

The non-emission period NEP described in FIG. 4 may be to prevent the sub-pixel SPij from emitting light with an undesirable luminance during an initialization period and a data writing period.

One or more non-emission periods NEP may be additionally provided while data written in the sub-pixel Spij is maintained (for example, one frame period). This may be done to effectively express a low grayscale by reducing the emission period EP of the sub-pixel SPij or to smoothly blur the motion of an image.

Figure 5:
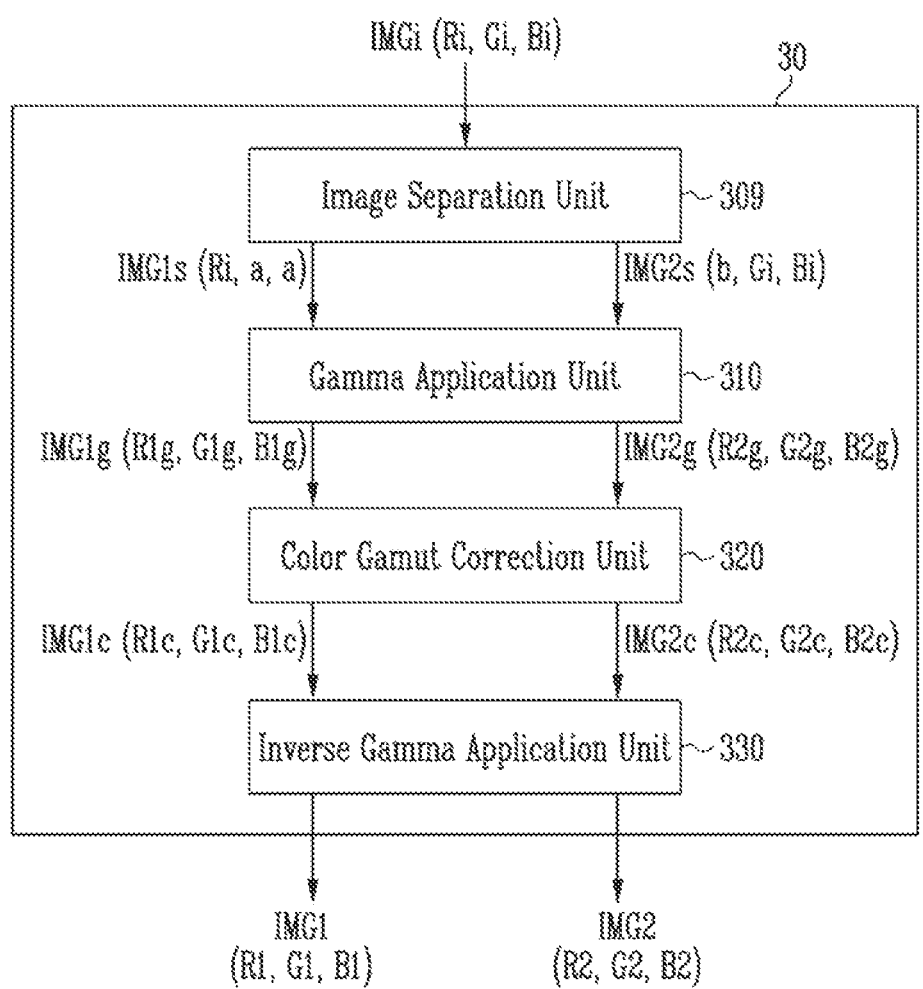
FIG. 5 is a diagram for explaining a stereo frame generator according to an embodiment of the present invention.

FIG. 5 is a diagram for explaining a stereo frame generator according to an embodiment of the present invention.

Referring to FIG. 5, the stereo frame generator 30 according to an embodiment of the present invention may include an image separation unit 309, a gamma application unit 310, a color gamut correction unit 320, and an inverse gamma application unit 330. Each of the image separation unit 309, the gamma application unit 310, the color gamut correction unit 320, and the inverse gamma application unit 330 may be implemented as a circuit.

The image separation unit 309 may generate a first separation frame IMG1s to include first grayscales Ri for the first color of the input frame IMGi, and generate a second separation frame IMG2s to include second grayscales Gi for the second color and third grayscales Bi for the third color of the input frame IMGi.

For example, the first grayscales Ri for the first color of the first separation frame IMG1s may be the same as the first grayscales Ri of the input frame IMGi. In this case, the image separation unit 309 may assign arbitrary values (a) to the second grayscales for the second color and the third grayscales for the third color of the first separation frame IMG1s. For example, the arbitrary value a may have a value greater than or equal to 1. When the arbitrary value a is 1, 128 grayscales may be obtained when 2.2 gamma is applied. When the arbitrary value a is 0, 0 grayscales may be obtained when 2.2 gamma is applied. Accordingly, when the arbitrary value a is 0, since the luminance of the first image may be excessively low, the arbitrary value a may be greater than or equal to 1.

Similarly, the second grayscales Gi for the second color of the second separation frame IMG2s may be the same as the second grayscales Gi of the input frame IMGi. The third grayscales Bi for the third color of the second separation frame IMG2s may be the same as the third grayscales Bi of the input frame IMGi. In this case, the image separation unit 309 may assign arbitrary values (b) to the first grayscales for the first color of the second separation frame IMG2s. For example, the arbitrary value b may have a value greater than or equal to 1. When the arbitrary value b is 1, 128 grayscales may be obtained when 2.2 gamma is applied. When the arbitrary value b is 0, 0 grayscales may be obtained when 2.2 gamma is applied. Accordingly, when the arbitrary value b is 0, since the luminance of the first image may be excessively low, the arbitrary value b may be greater than or equal to 1. According to an embodiment, the arbitrary values a and b may have the same value.

The gamma application unit 310 may generate a first gamma frame IMG1g by applying a gamma curve to the grayscales Ri, a, and a included in the first separation frame IMG1s. In addition, the gamma application unit 310 may generate a second gamma frame IMG2g by applying the gamma curve to the grayscales b, Gi, and Bi included in the second separation frame IMG2s.

The color gamut correction unit 320 may generate a first correction frame IMG1c by applying a first color gamut to grayscales R1g, G1g, and B1g of the first gamma frame IMG1g, and generate a second correction frame IMG2c by applying a second color gamut to grayscales R2g, G2g, and B2g of the second gamma frame IMG2g.

The inverse gamma application unit 330 may generate the first frame IMG1 by applying an inverse gamma curve to grayscales R1c, G1c, and B1c of the first correction frame IMG1c, and generate the second frame IMG2 by applying the inverse gamma curve to grayscales R2c, G2c, and B2c of the second correction frame IMG2c.

Figure 6:
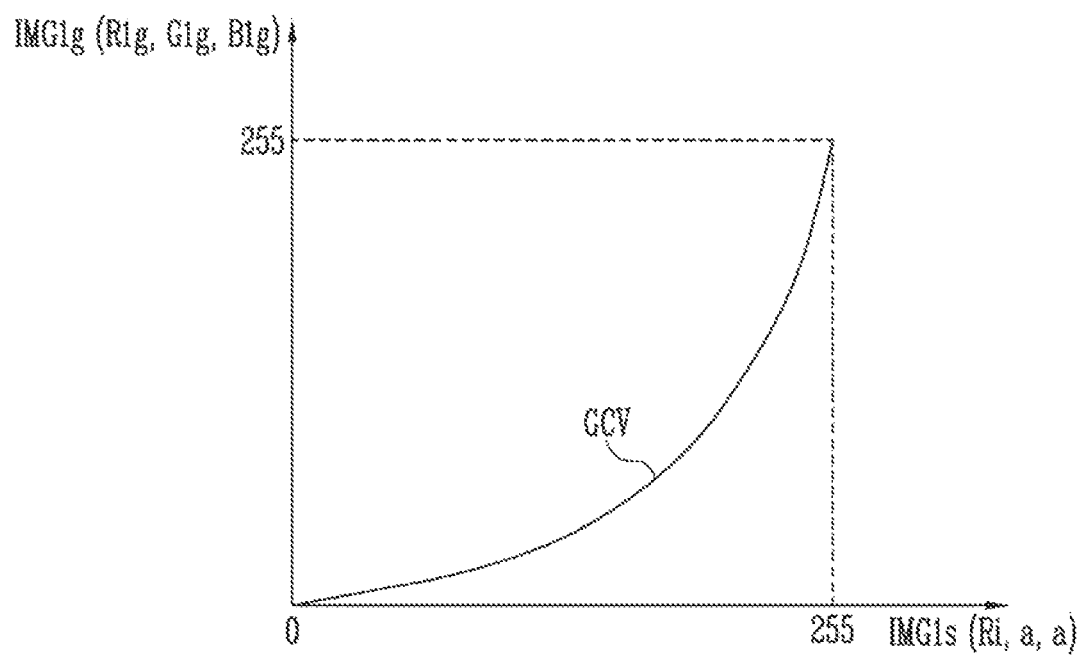
FIG. 6 is a diagram for explaining a gamma application unit according to an embodiment of the present invention.

FIG. 6 is a diagram for explaining a gamma application unit according to an embodiment of the present invention.

As described above, the gamma application unit 310 may generate the first gamma frame IMG1g by applying a gamma curve GCV to the grayscales Ri, a, and a included in the first separation frame IMG1s. In the graph of FIG. 6, the horizontal axis indicates grayscales of the input frame IMGi, and the vertical axis indicates grayscales of a gamma frame IMGg. Here, it is assumed that each grayscale is represented by 8 bits and has a value of 0 to 255. It is to be understood, however, that the number of bits representing each grayscale may vary depending on the display device.

The slope of the gamma curve GCV, in other words, the gamma value, may be variously set according to the display device DD, such as 2.0 gamma, 2.2 gamma, or 2.4 gamma. Additionally, according to an embodiment, a user may set the gamma value of the gamma curve GCV.

Since the final image displayed to the user reflects the gamma curve GCV, it is necessary to apply the color gamut based on the grayscales to which the gamma curve GCV is reflected. The gamma application unit 310 may generate the second gamma frame IMG2g by applying the gamma curve GCV to the grayscales b, Gi, and Bi included in the second separation frame IMG2s. A description thereof is similar to that of the first gamma frame IMG1g and will be omitted to avoid duplication.

FIGS. 7 to 12 are diagrams for explaining a color gamut correction unit according to an embodiment of the present invention.

Figure 7:
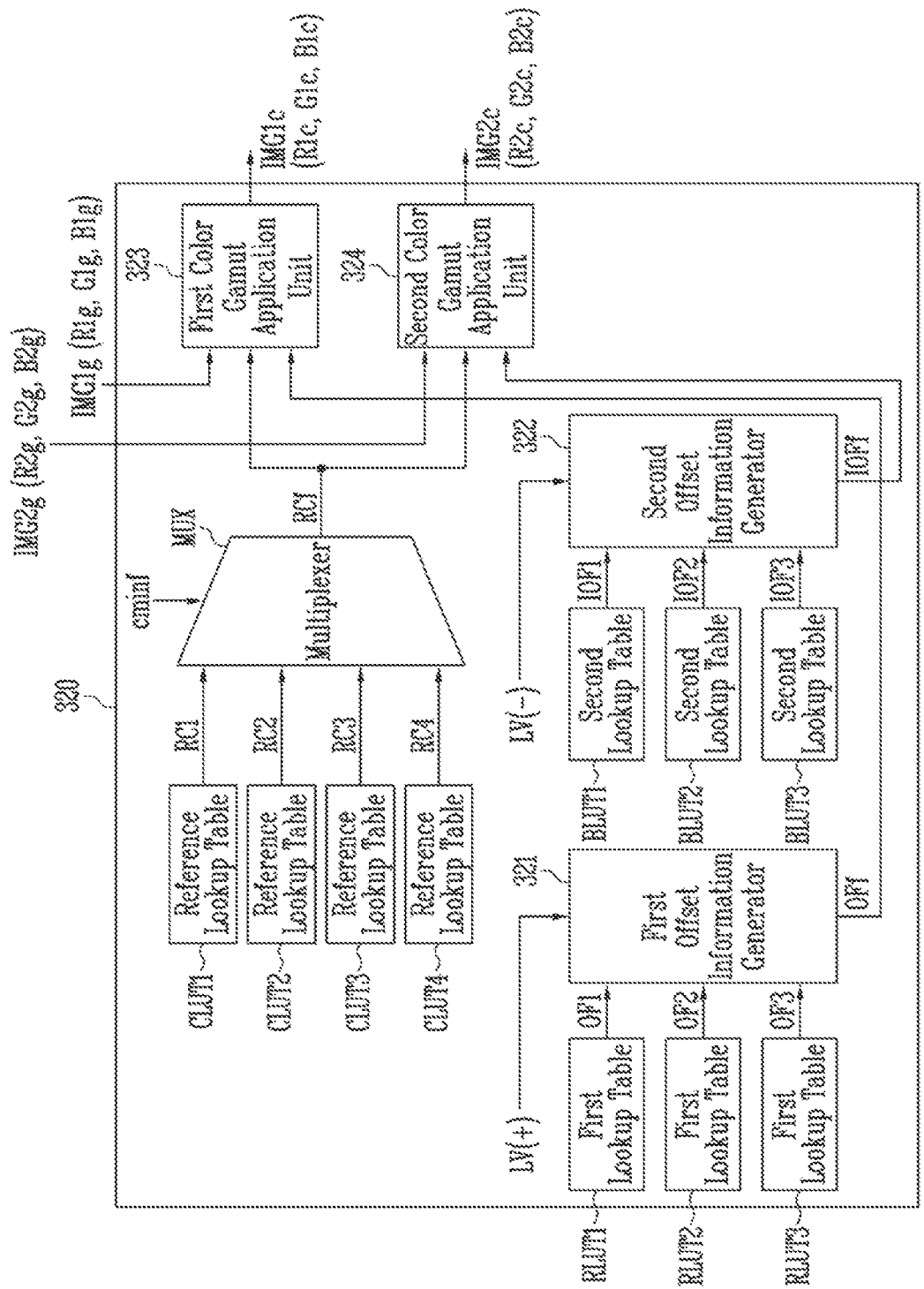

Referring to FIG. 7, the color gamut correction unit 320 according to an embodiment of the present invention may include reference lookup tables CLUT1, CLUT2, CLUT3, and CLUT4, a multiplexer MUX, first lookup tables RLUT1, RLUT2, and RLUT3, a first offset information generator 321, second lookup tables BLUT1, BLUT2, and BLUT3, a second offset information generator 322, a first color gamut application unit 323, and a second color gamut application unit 324.

First offset information OF1, OF2, and OF3 may be recorded in advance in the first lookup tables RLUT1, RLUT2, and RLUT3. In other words, the first offset information OF1, OF2, and OF3 may be prestored in the first lookup tables RLUT1, RLUT2, and RLUT3. The first lookup tables RLUT1, RLUT2, and RLUT3 may be composed of a memory device itself or a part thereof.

The first offset information generator 321 may receive a first shift level LV(+), and generate first final offset information OFf corresponding to the first shift level LV(+) based on the first offset information OF1, OF2, and OF3. For example, the first offset information generator 321 may generate the first final offset information OFf by summing or interpolating the first offset information OF1, OF2, and OF3 to correspond to the first shift level LV(+).

Second offset information IOF1, IOF2, and IOF3 may be recorded in advance in the second lookup tables BLUT1, BLUT2, and BLUT3. In other words, the second offset information IOF1, IOF2, and IOF3 may be prestored in the second lookup tables BLUT1, BLUT2, and BLUT3. The second lookup tables BLUT1, BLUT2, and BLUT3 may be composed of a memory device itself or a part thereof. In an embodiment, the second offset information IOF1, IOF2, and IOF3 may be inverted values of the first offset information OF1, OF2, and OF3. In this case, the second lookup tables BLUT1, BLUT2, and BLUT3 do not need to occupy a separate memory space, and values of the first lookup tables RLUT1, RLUT2, and RLUT3 may be inverted (for example, multiplied by (−) 1) and used as values of the second lookup tables BLUT1, BLUT2, and BLUT3.

The second offset information generator 322 may receive a second shift level LV(−), and generate second final offset information IOFf corresponding to the second shift level LV(−) based on the second offset information IOF1, IOF2, and IOF3. For example, the second offset information generator 322 may generate the second final offset information IOFf by summing or interpolating the second offset information IOF1, IOF2, and IOF3 to correspond to the second shift level LV(−).

Reference color gamut information RC1, RC2, RC3, and RC4 may be recorded in advance in the reference lookup tables CLUT1, CLUT2, CLUT3, and CLUT4. In other words, the reference color gamut information RC1, RC2, RC3, and RC4 may be prestored in the reference lookup tables CLUT1, CLUT2, CLUT3, and CLUT4. The reference lookup tables CLUT1, CLUT2, CLUT3, and CLUT4 may be composed of a memory device itself or a part thereof.

The multiplexer MUX may output selected reference color gamut information RCf among the reference color gamut information RC1, RC2, RC3, and RC4 based on received color mode information cminf. For example, the color mode information cminf may indicate a color mode manually selected for a color desired by the user. A program may automatically select the color mode. For example, the reference color gamut information RC1, RC2, RC3, and RC4 may have different color gamuts. The reference color gamut information RC1, RC2, RC3, and RC4 may be stored in advance or reset according to a user's preference.

The first color gamut application unit 323 may determine the first color gamut based on the selected reference color gamut information RCf and the first final offset information OFf. For example, the first color gamut application unit 323 may determine the first color gamut by adding the selected reference color gamut information RCf and the first final offset information OFf. In this case, the first color gamut application unit 323 may include an adder circuit. The first color gamut application unit 323 may generate the first correction frame IMG1c by applying the determined first color gamut to the first gamma frame IMG1g. For example, the first color gamut application unit 323 may generate the grayscales R1c, G1c, and B1c of the first correction frame IMG1c by mapping the grayscales R1g, G1g, and B1g included in the first gamma frame IMG1g into a range of the first color gamut.

The second color gamut application unit 324 may determine the second color gamut based on the selected reference color gamut information RCf and the second final offset information IOFf. For example, the second color gamut application unit 324 may determine the second color gamut by adding the selected reference color gamut information RCf and the second final offset information IOFf. In this case, the second color gamut application unit 324 may include an adder circuit. The second color gamut application unit 324 may generate the second correction frame IMG2c by applying the determined second color gamut to the second gamma frame IMG2g. For example, the second color gamut application unit 324 may generate the grayscales R2c, G2c, and B2c of the second correction frame IMG2c by mapping the grayscales R2g, G2g, and B2g included in the second gamma frame IMG2g into a range of the second color gamut.

Figure 8:
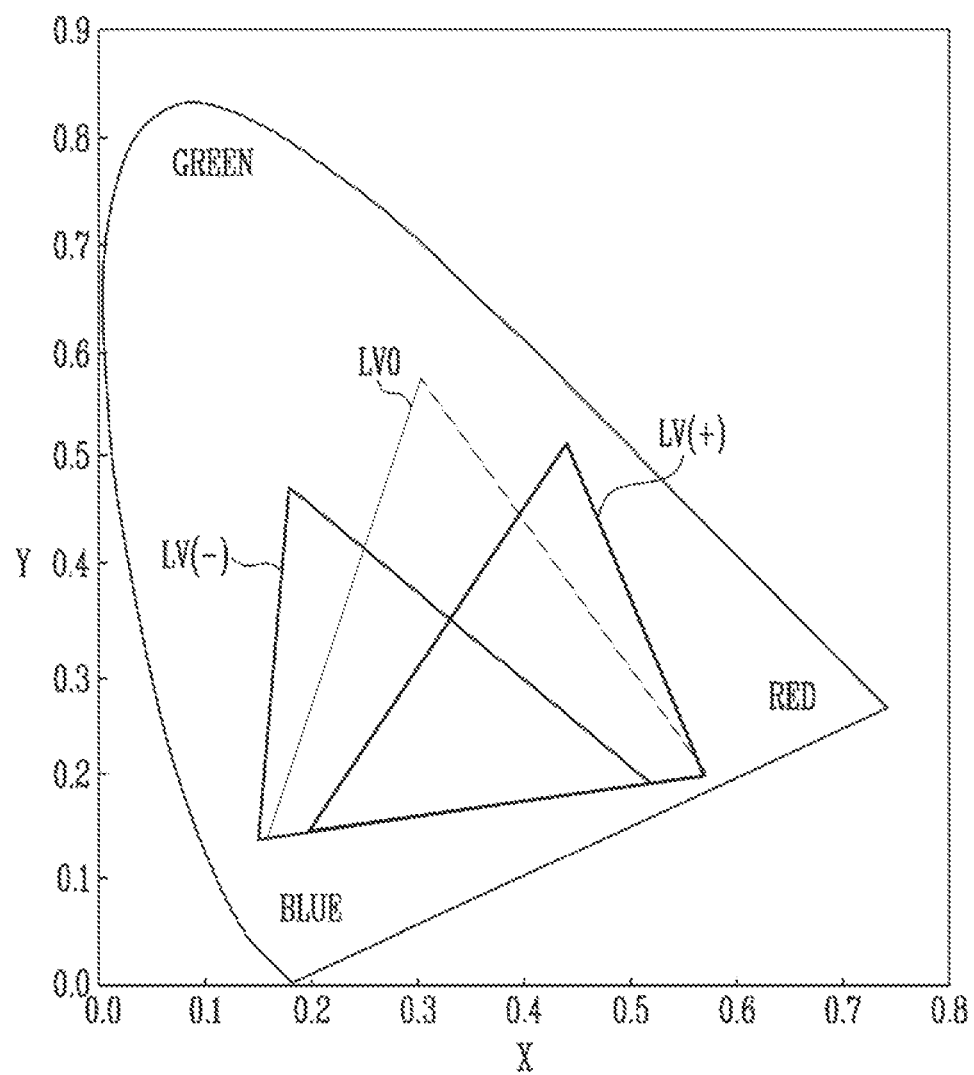

Referring to FIG. 8, in the color space specified in CIE 1931, a reference color gamut according to a reference level LV0, a first color gamut according to an arbitrary first shift level LV(+), and a second color gamut according to an arbitrary second shift level LV(−) are shown.

Based on the reference color gamut, a ratio of the blue gamut in the first color gamut may be smaller than that of the reference color gamut. Additionally, based on the reference color gamut, a ratio of the red gamut in the second color gamut may be smaller than that of the reference color gamut. According to an embodiment of the present invention, depending on a shift level, it can be determined whether to reduce the ratio of the blue gamut in the color gamut or the ratio of the red gamut in the color gamut.

Figure 9:
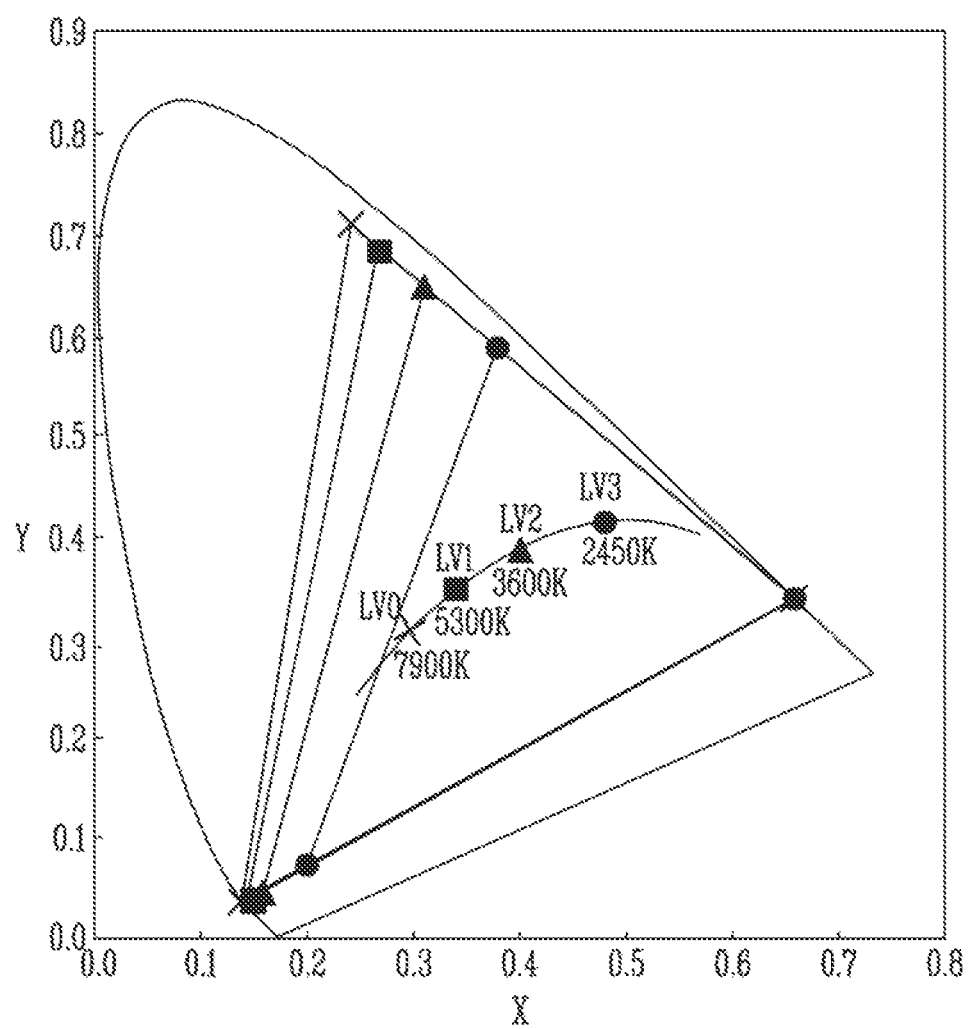

Referring to FIG. 9, a reference color gamut (vertex is X) when the first shift level LV(+) is the reference level LV0, a color gamut (vertex is a square) when the first shift level LV(+) is a first level LV1, a color gamut (vertex is a triangle) when the first shift level LV(+) is a second level LV2, and a color gamut (vertex is a circle) when the first shift level LV(+) is a third level LV3 are shown as an example. For example, the third level LV3 may be an maximum value of the first shift level LV(+).

For example, the reference color gamut when the first shift level LV(+) is the reference level LV0 may be set to a case where the color temperature of the white grayscale is 7900K. The color gamut when the first shift level LV(+) is the first level LV1 may be set to a case where the color temperature of the white grayscale is 5300K. The color gamut when the first shift level LV(+) is the second level LV2 may be set to a case where the color temperature of the white grayscale is 3600K. The color gamut when the first shift level LV(+) is the third level LV3 may be set to a case where the color temperature of the white grayscale is 2450K.

Hereinafter, operations of the first offset information generator 321 and the first color gamut application unit 323 will be described in detail with reference to FIGS. 10 to 12. Since the second offset information generator 322 and the second color gamut application unit 324 may operate similarly, duplicate descriptions thereof will be omitted.

Figure 10:
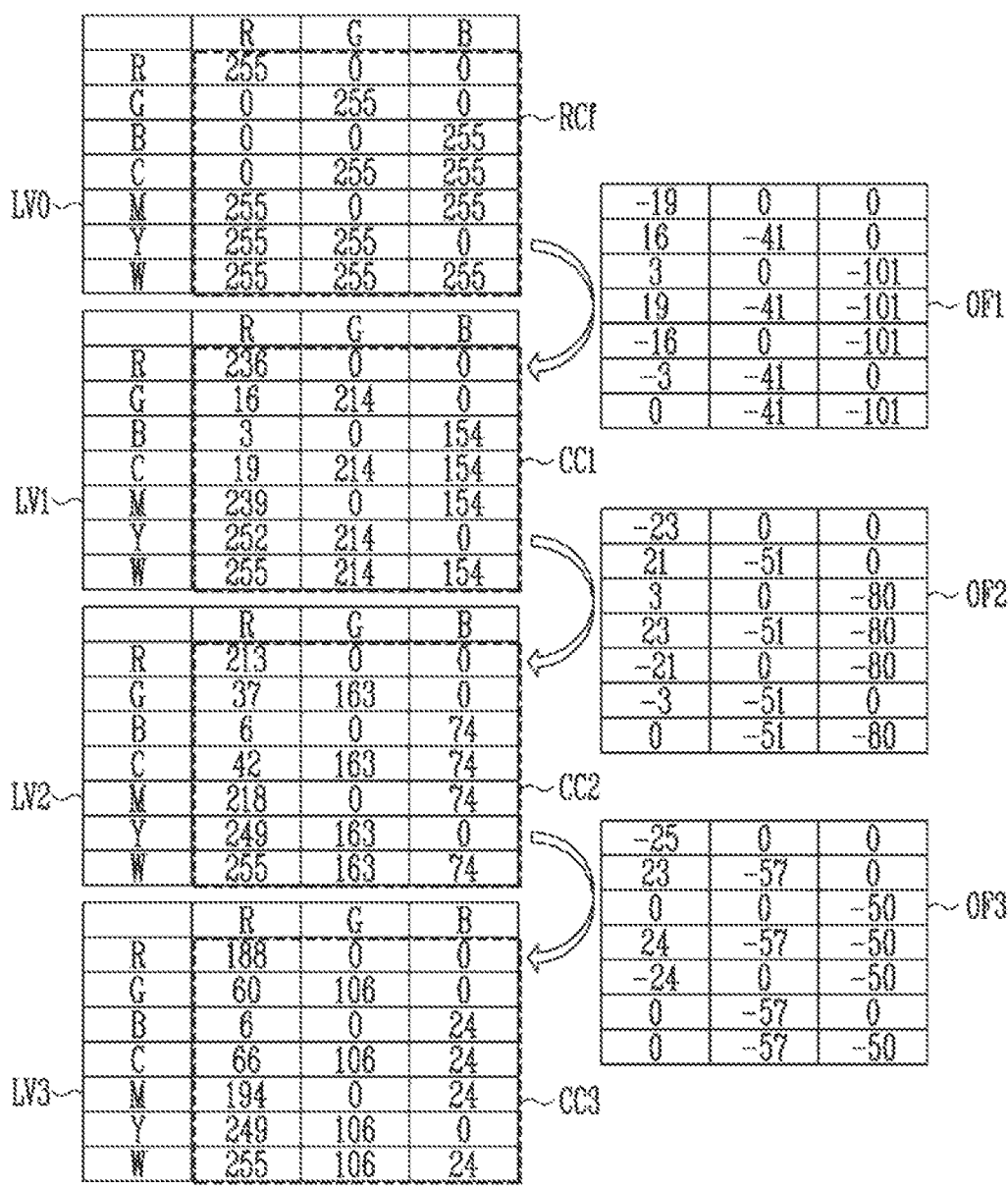

Referring to FIG. 10, examples of the selected reference color gamut information RCf defining the reference level LV0, color gamut information CC1 for the color gamut of the first level LV1, color gamut information CC2 for the color gamut of the second level LV2, and color gamut information CC3 for the color gamut of the third level LV3 are illustrated in tables, respectively.

In each color gamut information, the first row indicates red grayscale information R, the second row indicates green grayscale information G, the third row indicates blue grayscale information B, the fourth row indicates cyan grayscale information C, the fifth row indicates magenta grayscale information M, the sixth row indicates yellow grayscale information Y, and the seventh row indicates white grayscale information W.

Additionally, in each color gamut information, the first column indicates a red grayscale, the second column indicates a green grayscale, and the third column indicates a blue grayscale. For example, in the selected reference color gamut information RCf, the cyan grayscale information C may be expressed as red grayscale 0, green grayscale 255, and blue grayscale 255. Also in the selected reference color gamut information RCf, the blue grayscale information B may be expressed as red grayscale 0, green grayscale 0, and blue grayscale 255.

The first offset information OF1 may correspond to a difference value between the color gamut information CC1 and the reference color gamut information RCf. The second offset information OF2 may correspond to a difference value between the color gamut information CC2 and the color gamut information CC1. The third offset information OF3 may correspond to a difference value between the color gamut information CC3 and the color gamut information CC2.

When the first shift level LV(+) corresponds to predetermined levels LV1, LV2, and LV3, the first offset information generator 321 may generate the first final offset information OFf by summing at least some of the first offset information OF1, OF2, and OF3. For example, when the first shift level LV(+) is the second level LV2, the first offset information generator 321 may generate the first final offset information OFf by summing the first offset information OF1 and the first offset information OF2.

When the first shift level LV(+) does not correspond to the predetermined levels LV1, LV2, and LV3, the first offset information generator 321 may generate the first final offset information OFf by summing or interpolating the first offset information OF1, OF2, OF3.

For example, a level value corresponding to the reference level LV0 may be 0, and level values corresponding to the predetermined first, second, and third levels LV1, LV2, and LV3 may be 102, 178, and 255, respectively.

When the first shift level LV(+) is 50, the first offset information generator 321 may determine the first final offset information OFf using the first offset information OF1 (refer to Equation 1).

$$OFf = \mathrm{round}((OF1/LV1) * LVI) \qquad \text{[Equation 1]}$$

Here, OFf may be the first final offset information OFf, OF1 may be the first offset information OF1, LV1 may be the level value of the first level LV1, and LVI may be the input first shift level V(+). round( ) may be a rounding function.

Referring to FIG. 11, when LV1 is 102 and LVI is 50, the first final offset information OFf when Equation 1 is applied is shown as an example.

The first color gamut application unit 323 may determine first color gamut information LVI_CS corresponding to the first color gamut by adding the first final offset information OFf to the reference color gamut information RCf. The first color gamut information LVI_CS may include red grayscale information LVI_R [246,0,0], green grayscale information LVI_G [8,235,0], blue grayscale information LVI_B [1,0,205], cyan grayscale information LVI_C [9,235,205], magenta grayscale information LVI_M [247,0,205], yellow grayscale information LVI_Y [254,235,0], and white grayscale information LVI_W [255,235,205]. In each grayscale information, the first column may indicate the red grayscale, the second column may indicate the green grayscale, and the third column may indicate the blue grayscale.

When the first shift level LV(+) is a value between 102 and 178, the first offset information generator 321 may determine the first final offset information OFf using the first offset information OF1 and OF2 (refer to Equation 2).

$$OFf = \text{round}((OF2/(LV2 - LV1)) * (LVI - LV1)) + OF1 \quad \text{[Equation 2]}$$

Here, OFf may be the first final offset information OFf, OF1 may be the first offset information OF1, OF2 may be the first offset information OF2, LV1 may be the level value of the first level LV1, LV2 may be the level value of the second level LV2, and LVI may be the input first shift level LV(+). round( ) may be a rounding function.

When the first shift level LV(+) is a value between 178 and 255, the first offset information generator 321 may determine the first final offset information OFf using the first offset information OF1, OF2, and OF3 (refer to Equation 3).

$$OFf = \text{round}((OF3/(LV3 - LV2)) * (LVI - LV2)) + OF1 + OF2 \quad \text{[Equation 3]}$$

Here, OFf may be the first final offset information OFf, OF1 may be the first offset information OF1, OF2 may be the first offset information OF2, OF3 may be the first offset information OF3, LV2 may be the level value of the second level LV2, LV3 may be the level value of the third level LV3, and LVI may be the input first shift level LV(+). round( ) may be a rounding function.

Referring to FIG. 12, a process of mapping the grayscales R1g, G1g, and B1g included in the first gamma frame IMG1g into the range of the first color gamut by the first color gamut application unit 323 will be described. The first color gamut application unit 323 may output the first correction frame IMG1c composed of the mapped grayscales R1c, G1c, and B1c.

As described above, the first color gamut information LVI_CS may include red grayscale information LVI_R, green grayscale information LVI_G, blue grayscale information LVI_B, cyan grayscale information LVI_C, magenta grayscale information LVI_M, yellow grayscale information LVI_Y, and white grayscale information LVI_W. In addition, the first color gamut information LVI_CS may further include black grayscale information LVI_K. In general, a red grayscale value, a green grayscale value, and a blue grayscale value of the black grayscale information LVI_K may all be set to 0. According to an embodiment, values of the black grayscale information LVI_K may be set to a value other than 0.

Referring to FIG. 12, the first color gamut information LVI_CS may be expressed as a cube including three coordinate axes LVI_R, LVI_G, and LVI_B orthogonal to each other with the black grayscale information LVI_K constituting the origin and located at the origin.

For example, the first color gamut application unit 323 may convert the grayscales R1g, G1g, and B1g of the first gamma frame IMG1g into the grayscales R1c, G1c, and B1c of the first correction frame IMG1c through the table of FIG. 12 and Equations 4, 5, and 6 below.

$$R1c = \text{LVI\_K\_R} + C1\_R * R1g/\text{r\_step} + \quad \text{[Equation 4]}$$
$$C2\_R * G1g/\text{g\_step} + C3\_R * B1g/\text{b\_step}$$

$$G1c = \text{LVI\_K\_G} + C1\_G * R1g/\text{r\_step} + \quad \text{[Equation 5]}$$
$$C2\_G * G1g/\text{g\_step} + C3\_G * B1g/\text{b\_step}$$

$$B1c = \text{LVI\_K\_B} + C1\_B * R1g/\text{r\_step} + \quad \text{[Equation 6]}$$
$$C2\_B * G1g/\text{g\_step} + C3\_B * B1g/\text{b\_step}$$

Here, R1c may be a red grayscale of the first correction frame IMG1c, G1c may be a green grayscale of the first correction frame IMG1c, and B1c may be a blue grayscale of the first correction frame IMG1c. R1c, G1c, and B1c may constitute one pixel of the first correction frame IMG1c.

Additionally, R1g may be a red grayscale of the first gamma frame IMG1g, G1g may be a green grayscale of the first gamma frame IMG1g, and B1g may be a blue grayscale of the first gamma frame IMG1g. R1g, G1g, and B1g may constitute one pixel of the first gamma frame IMG1g.

Additionally, LVI_K_R may be a red grayscale of the black grayscale information LVI_K, LVI_K_G may be a green grayscale of the black grayscale information LVI_K, and LVI_K_B may be a blue grayscale of the black grayscale information LVI_K.

Additionally, C1_R may be a red grayscale of C1 calculated according to the table in FIG. 12, C1_G may be a green grayscale of C1 calculated according to the table in FIG. 12, and C1_B may be a blue grayscale of C1 calculated according to the table in FIG. 12. C2_R may be a red grayscale of C2 calculated according to the table in FIG. 12, C2_G may be a green grayscale of C2 calculated according to the table in FIGS. 12, and C2_B may be a blue grayscale of C2 calculated according to the table in FIG. 12. C3_R may be a red grayscale of C3 calculated according to the table in FIG. 12, C3_G may be a green grayscale of C3 calculated according to the table in FIGS. 12, and C3_B may be a blue grayscale of C3 calculated according to the table in FIG. 12. r_step, g_step, and b_step may be constants. For example, r_step, g_step, and b_step may each be 128.

For example, a case in which the red grayscale R1g of the gamma frame IMGg is greater than the blue grayscale B1g of the gamma frame IMGg and the blue grayscale B1g of the gamma frame IMGg is greater than the green grayscale G1g of the gamma frame IMGg may correspond to the case A2 of the table shown in FIG. 12. In this case, the red grayscale C1_R, the green grayscale C1_G, and the blue grayscale C1_B of C1 may be determined by values obtained by subtracting the black grayscale information LVI_K from the red grayscale information LVI_R. In addition, in the case A2 of the table shown in FIG. 12, the red grayscale C2_R, the green grayscale C2_G, and the blue grayscale C2_B of C2 may be determined by values obtained by subtracting the magenta grayscale information LVI_M from the white grayscale information LVI_W. In addition, in the case A2 of the table shown in FIG. 12, the red grayscale C3_R, the green grayscale C3_G, and the blue grayscale C3_B of C3 may be determined by values obtained by subtracting the red grayscale information LVI_R from the magenta grayscale information LVI_M.

Figure 13:
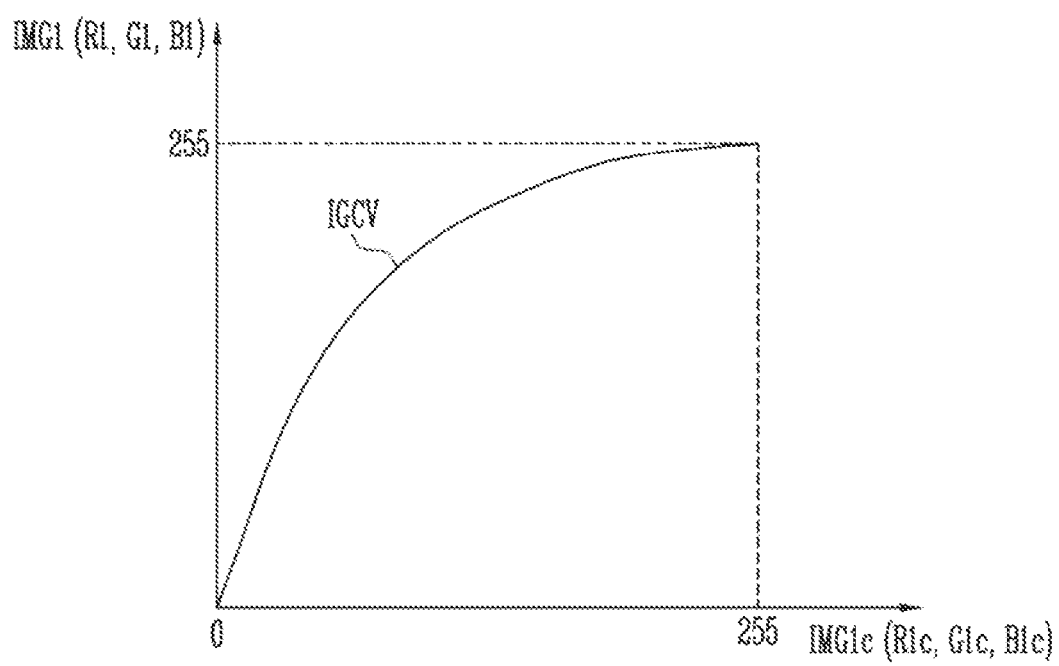
FIG. 13 is a diagram for explaining an inverse gamma application unit according to an embodiment of the present invention.

FIG. 13 is a diagram for explaining an inverse gamma application unit according to an embodiment of the present invention.

As described above, the inverse gamma application unit 330 may generate the first frame IMG1 by applying an inverse gamma curve IGCV to the first correction frame IMG1c and generate the second frame IMG2 by applying the inverse gamma curve IGCV to the second correction frame IMG2c. An inverse gamma value of the inverse gamma curve IGCV may be the reciprocal of the gamma value of the gamma curve GCV of FIG. 6.

For example, the horizontal axis of the graph in FIG. 13 indicates the grayscales R1c, G1c, and B1c of the first correction frame IMG1c, respectively. The vertical axis of the graph in FIG. 13 indicates the grayscales R1, G1, and B1 of the first frame IMG1, respectively. Here, it is assumed that each grayscale is represented by 8 bits and has a value of 0 to 255. However, the number of bits representing each grayscale may vary depending on the display device.

Since the data driver 12a generates the data voltages using gamma voltages in which gamma values are reflected, it is necessary to prevent double reflection of the gamma values.

The display device and the driving method thereof according to embodiments of the present invention may generate a stereo image on its own even though a processor generates and transmits only a mono image. In other words, embodiments of the present invention provide a display device and a driving method thereof that can produce a stereo image independently, even when the processor provides only a mono image.

It is to be understood that the invention has been described with reference to various embodiments, but those skilled in the art will appreciate that various modifications and equivalent embodiments are possible without departing from the scope of the invention as set forth in the claims.

What is claimed is:

1. A display device comprising:
   a processor outputting an input frame;
   a stereo frame generator generating a first frame and a second frame based on the input frame;
   a first sub-display device displaying a first image based on the first frame; and
   a second sub-display device displaying a second image based on the second frame,
   wherein a first color gamut of the first frame is different from a second color gamut of the second frame, and
   wherein the stereo frame generator includes:
   an image separation unit generating a first separation frame that includes first grayscales for a first color of the input frame and generating a second separation frame that includes second grayscales for a second color of the input frame and third grayscales for a third color of the input frame, and
   wherein the image separation unit assign arbitrary values to the second grayscales for the second color and the third grayscales for the third color of the first separation frame, and wherein the image separation unit assign arbitrary values to the first grayscales for the first color of the second separation frame.

2. The display device of claim 1, wherein the number of grayscales included in the input frame is the same as the number of grayscales included in each of the first frame and the second frame.

3. The display device of claim 1, wherein the stereo frame generator further includes:
   a gamma application unit generating a first gamma frame by applying a gamma curve to grayscales included in the first separation frame and generating a second gamma frame by applying the gamma curve to grayscales included in the second separation frame;
   a color gamut correction unit generating a first correction frame by applying the first color gamut to the first gamma frame and generating a second correction frame by applying the second color gamut to the second gamma frame; and
   an inverse gamma application unit generating the first frame by applying an inverse gamma curve to the first correction frame and generating the second frame by applying the inverse gamma curve to the second correction frame.

4. The display device of claim 3, wherein the color gamut correction unit includes:
   a plurality of first lookup tables that include a plurality of first offset information;
   a first offset information generator receiving a first shift level and generating first final offset information corresponding to the first shift level based on the plurality of first offset information;
   a plurality of second lookup tables that include a plurality of second offset information; and
   a second offset information generator receiving a second shift level and generating second final offset information corresponding to the second shift level based on the plurality of second offset information.

5. The display device of claim 4, wherein the plurality of second offset information is inverted values of the plurality of first offset information.

6. The display device of claim 4, wherein the first offset information generator generates the first final offset information by summing or interpolating the plurality of first offset information, and
   wherein the second offset information generator generates the second final offset information by summing or interpolating the plurality of second offset information.

7. The display device of claim 4, wherein the color gamut correction unit further includes:
   a plurality of reference lookup tables that include a plurality of reference color gamut information; and
   a multiplexer outputting selected reference color gamut information among the plurality of reference color gamut information based on color mode information.

8. The display device of claim 7, wherein the color gamut correction unit further includes:
   a first color gamut application unit determining the first color gamut based on the selected reference color gamut information and the first final offset information, and generating the first correction frame by applying the first color gamut to the first gamma frame; and
   a second color gamut application unit determining the second color gamut based on the selected reference color gamut information and the second final offset information, and generating the second correction frame by applying the second color gamut to the second gamma frame.

9. The display device of claim 8, wherein the first color gamut application unit determines the first color gamut by adding the selected reference color gamut information and the first final offset information, and
wherein the second color gamut application unit determines the second color gamut by adding the selected reference color gamut information and the second final offset information.

10. The display device of claim 9, wherein the first color gamut application unit generates the first correction frame by mapping grayscales included in the first gamma frame into a range of the first color gamut, and
wherein the second color gamut application unit generates the second correction frame by mapping grayscales included in the second gamma frame into a range of the second color gamut.

11. A driving method of a display device comprising:
generating a first frame and a second frame based on an input frame;
displaying a first image through a first sub-display device based on the first frame; and
displaying a second image through a second sub-display device based on the second frame,
wherein a first color gamut of the first frame is different from a second color gamut of the second frame,
wherein the generating the first frame and the second frame includes:
generating a first separation frame that includes first grayscales for a first color of the input frame and generating a second separation frame that includes second grayscales for a second color of the input frame and third grayscales for a third color of the input frame;
assigning arbitrary values to the second grayscales for the second color and the third grayscales for the third color of the first separation frame; and
assigning arbitrary values to the first grayscales for the first color of the second separation frame.

12. The driving method of claim 11, wherein the number of grayscales included in the input frame is the same as the number of grayscales included in each of the first frame and the second frame.

13. The driving method of claim 11, wherein the generating the first frame and the second frame further includes:
generating a first gamma frame by applying a gamma curve to grayscales included in the first separation frame and generating a second gamma frame by applying the gamma curve to grayscales included in the second separation frame;
generating a first correction frame by applying the first color gamut to the first gamma frame and generating a second correction frame by applying the second color gamut to the second gamma frame; and
generating the first frame by applying an inverse gamma curve to the first correction frame and generating the second frame by applying the inverse gamma curve to the second correction frame.

14. The driving method of claim 13, further comprising:
generating first final offset information corresponding to a first shift level based on the first shift level and a plurality of first offset information; and
generating second final offset information corresponding to a second shift level based on the second shift level and a plurality of second offset information.

15. The driving method of claim 14, wherein the plurality of second offset information is inverted values of the plurality of first offset information.

16. The driving method of claim 14, wherein the first final offset information is generated by summing or interpolating the plurality of first offset information, and
wherein the second final offset information is generated by summing or interpolating the plurality of second offset information.

17. The driving method of claim 14, further comprising:
selecting one of a plurality of reference color gamut information based on color mode information.

18. The driving method of claim 17, wherein the first color gamut is determined based on the selected reference color gamut information and the first final offset information, and the first correction frame is generated by applying the first color gamut to the first gamma frame, and
wherein the second color gamut is determined based on the selected reference color gamut information and the second final offset information, and the second correction frame is generated by applying the second color gamut to the second gamma frame.

19. The driving method of claim 18, wherein the first color gamut is determined by adding the selected reference color gamut information and the first final offset information, and
wherein the second color gamut is determined by adding the selected reference color gamut information and the second final offset information.

20. The driving method of claim 19, wherein the first correction frame is generated by mapping grayscales included in the first gamma frame into a range of the first color gamut, and
wherein the second correction frame is generated by mapping grayscales included in the second gamma frame into a range of the second color gamut.

* * * * *